(12) United States Patent
Wymer et al.

(10) Patent No.: US 9,469,481 B2
(45) Date of Patent: Oct. 18, 2016

(54) CAROUSEL CONVEYOR DRIVE MODULE

(71) Applicant: Dorner Mfg. Corp., Hartland, WI (US)

(72) Inventors: Mathew C. Wymer, Germantown, WI (US); Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 14/482,609

(22) Filed: Sep. 10, 2014

(65) Prior Publication Data

US 2016/0068345 A1  Mar. 10, 2016

(51) Int. Cl.
| | |
|---|---|
| *B65G 23/06* | (2006.01) |
| *B65G 17/00* | (2006.01) |
| *B65G 17/38* | (2006.01) |
| *B65G 23/12* | (2006.01) |
| *B65G 17/22* | (2006.01) |
| *B65G 21/20* | (2006.01) |

(52) U.S. Cl.
CPC .............. *B65G 23/06* (2013.01); *B65G 17/22* (2013.01); *B65G 21/2054* (2013.01)

(58) Field of Classification Search
None
See application file for complete search history.

(56) References Cited

U.S. PATENT DOCUMENTS

| | | | |
|---|---|---|---|
| 6,315,101 B1 | 11/2001 | Hugon | |
| 6,929,114 B1 * | 8/2005 | Smeathers | B65G 21/00 198/833 |
| 7,621,392 B2 * | 11/2009 | Langsdorf | B65G 17/066 198/502.1 |
| 2008/0124015 A1 * | 5/2008 | Fujiwara | B65G 39/09 384/484 |

* cited by examiner

*Primary Examiner* — Kavel Singh
(74) *Attorney, Agent, or Firm* — Andrus Intellectual Property Law, LLP

(57) ABSTRACT

A center drive module for use with a carousel conveyor that includes a continuous loop conveyor chain. The drive module includes a drive motor that rotates one or more sprocket wheels that each engage drive lugs formed on the bottom surface the conveyor chain to move the conveyor chain along the support frame. The drive module includes a pair of guide rollers positioned on opposite sides of the sprocket wheel. The guide rollers engage the conveyor chain and rotate upon the movement of the conveyor chain. Each of the guide wheels resists vertical movement of the conveyor chain caused by the rotating sprocket wheels.

17 Claims, 6 Drawing Sheets

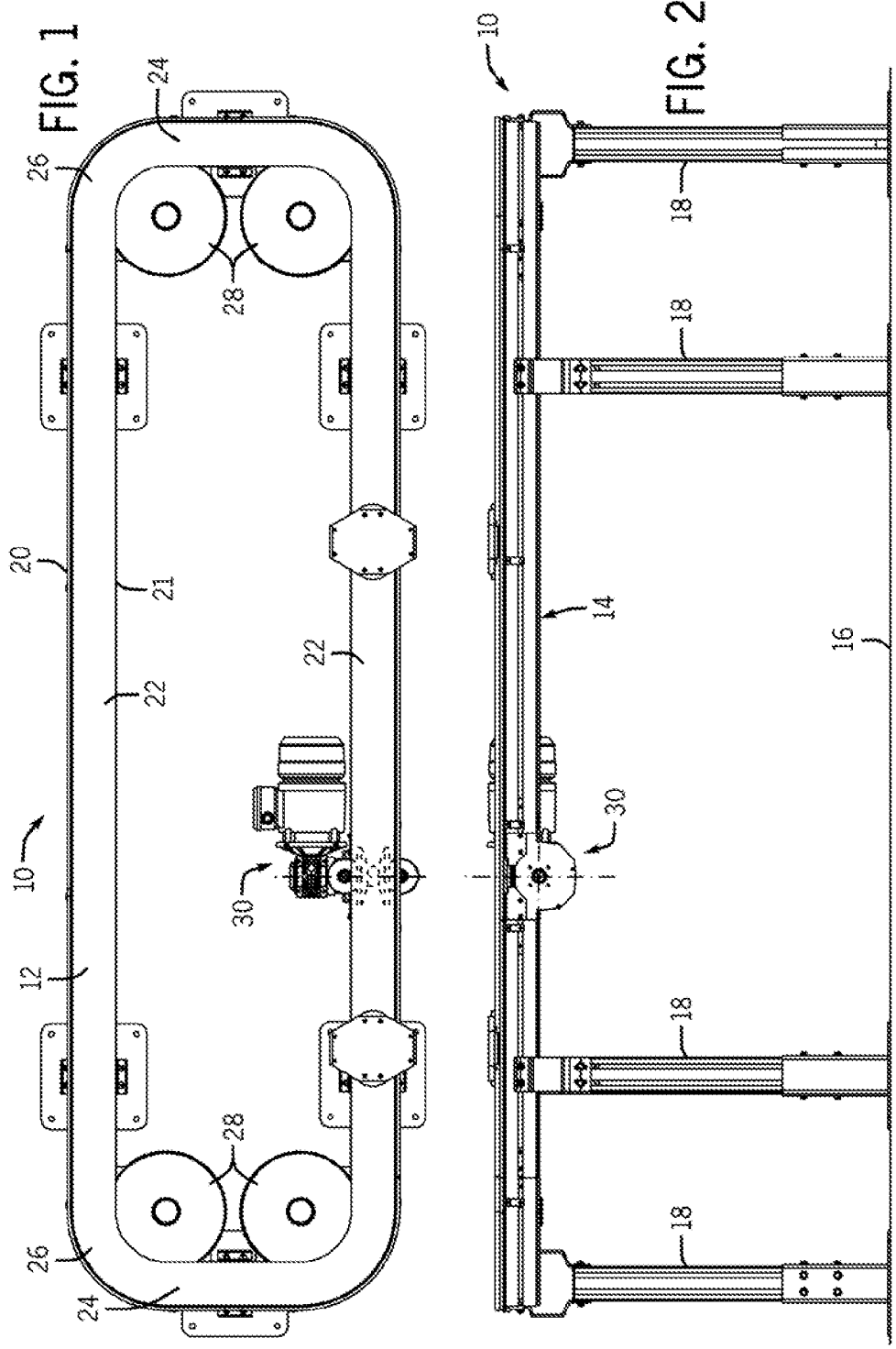

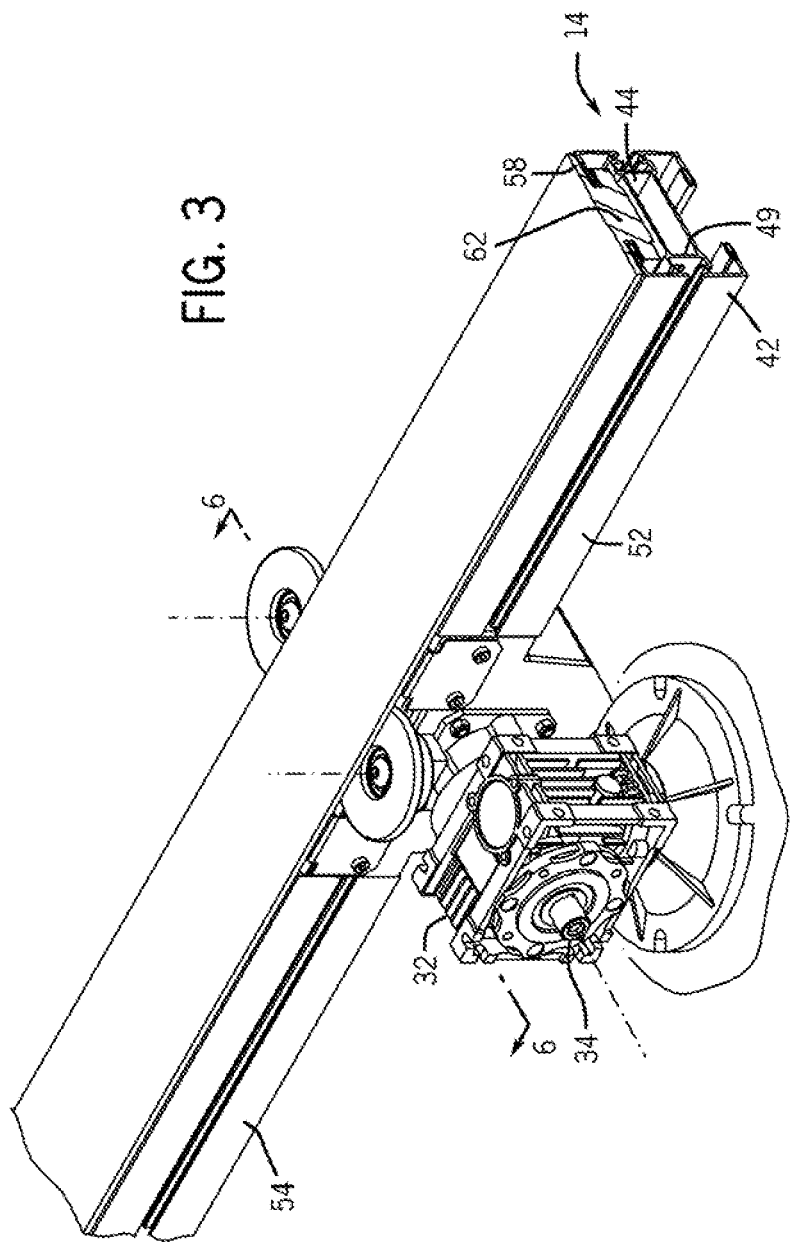

CAROUSEL CONVEYOR DRIVE MODULE

BACKGROUND

The present disclosure generally relates to a conveyor assembly. More specifically, the present disclosure relates to a carousel conveyor assembly that includes a chain driven by a center drive module.

Many different types of conveyor systems have been used to convey materials over either short or long distances. Different types of drive arrangements have been utilized in such conveyor systems. One type of drive assembly is the corner drive assembly that is used on a carousel conveyor. The carousel conveyor includes a conveyor chain that rotates along a continuous path to move material supported on the conveyor chain. In many currently available carousel conveyors, one or multiple driven wheels frictionally engage the side edge of the conveyor chain to impart driven movement to the conveyor chain as the conveyor chain travels around a corner of the conveyor path. Since the chain of the carousel conveyor is continuous, the drive wheels engage a side surface of the drive chain to impart the motion of the conveyor chain. Since the conveyor chain is not designed to be driving by the side surface, such a drive assembly is not the most efficient or durable.

In an embodiment in which the conveyor chain is driven from below, the driving rotation of the sprocket wheels exert a longitudinal force on the conveyor chain to move the conveyor chain along the conveyor path. However, when the rotating sprocket wheels engage the conveyor chain, the rotating sprocket wheels also exert an upward force on the conveyor chain. In currently available systems, the conveyor chain is prevented from moving upward by flanges formed on the support frame of the conveyor assembly. The side flanges are subject to wear and/or cause wear in the moving conveyor chain. Therefore, a need exists for a center drive module that drives the conveyor chain and reduces wear to both the conveyor chain and within the center drive module.

SUMMARY

The present disclosure generally relates to a drive module for use with a carousel conveyor that includes a continuous loop conveyor chain. More specifically, the present disclosure relates to a center drive module that imparts longitudinal movement to the conveyor chain and restricts vertical movement of the conveyor chain as a result of the driven engagement.

The drive module of the present disclosure includes a drive motor that includes a drive shaft connected to one or more sprocket wheel. The drive motor rotates the drive shaft and the sprocket wheel. Outer teeth of the sprocket wheel engage drive lugs formed on the bottom surface of the conveyor chain such that the sprocket wheel causes the conveyor chain to move along the longitudinal conveyor path.

The drive module further includes a pair of drive rollers that engage the conveyor chain. When the conveyor chain is moving along the conveyor path, each of the pair of guide rollers rotate along with the longitudinal movement of the conveyor chain.

Each of the guide rollers includes a circular outer flange that is received within an alignment slot formed on each side of the conveyor chain. The interaction between the outer flange on each of the guide rollers and the alignment slots formed in the conveyor chain prevent the conveyor chain from moving in a direction perpendicular to the longitudinal direction of chain movement. In this manner, each of the guide rollers prevents the conveyor chain from moving vertically during the driven movement of the conveyor chain by the sprocket wheels.

The entire drive module is mounted to the support frame of the carousel conveyor and can be removed and replaced as desired. The drive module is mounted within a gap formed in the support frame of the carousel conveyor.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 1 is a top view of a carousel conveyor incorporating the center drive module of the present disclosure;

FIG. 2 is a side view of the carousel conveyor showing the mounting position of the center drive module;

FIG. 3 is a perspective view of the center drive module mounted to the support frame of the carousel conveyor;

FIG. 4b is a top view of the drive module shown in FIG. 4a;

DETAILED DESCRIPTION

Figure 4A:
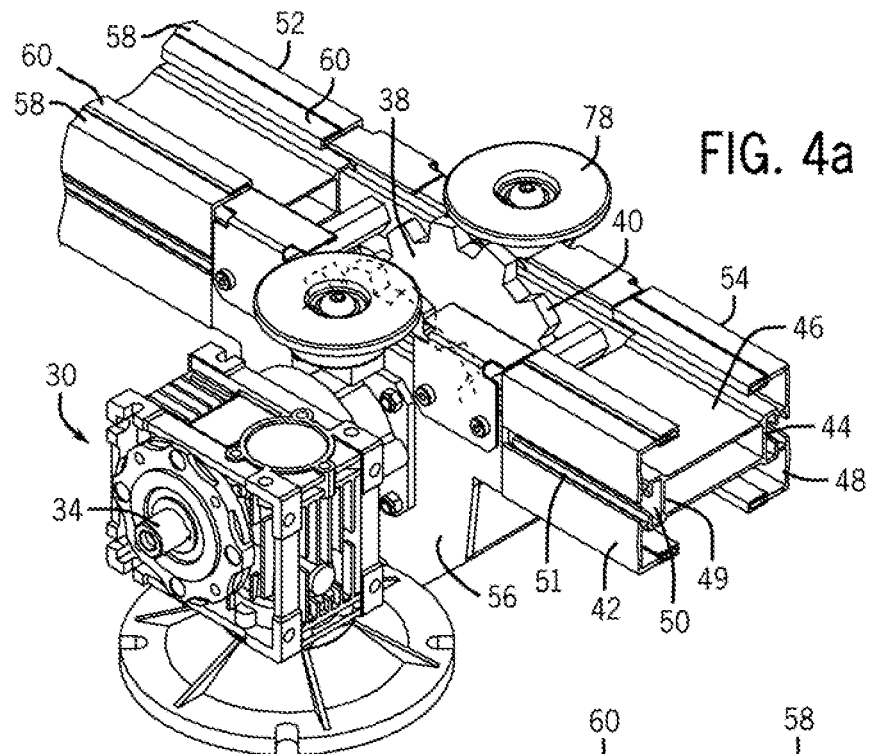
FIG. 4a is a perspective view similar to FIG. 3 with the conveyor chain removed.

FIGS. 1 and 2 illustrate a carousel conveyor 10 constructed in accordance with the present disclosure. The carousel conveyor 10 is a specific type of conveyor that includes a continuous loop that transports products or materials for processing along a continuous path defined by a top surface 12 of a top running conveyor chain. As shown in FIG. 2, the carousel conveyor 10 includes a support frame 14 that is supported above the ground 16 by a series of support legs 18. The support frame 14 includes an outer edge 20 and an inner edge 21 that define the conveyor path. In the embodiment shown in FIGS. 1 and 2, the conveyor path has a generally rectangular shape having a pair of side run 22 and a pair of end run 24 joined by corresponding curved, corner sections 26. The top surface 12 is formed by a series of individual, linked chain sections. Each of the corner sections 26 includes a corner guide wheel 28 that helps guide the run of the conveyor chain around each of the corner sections 26.

Figure 6:
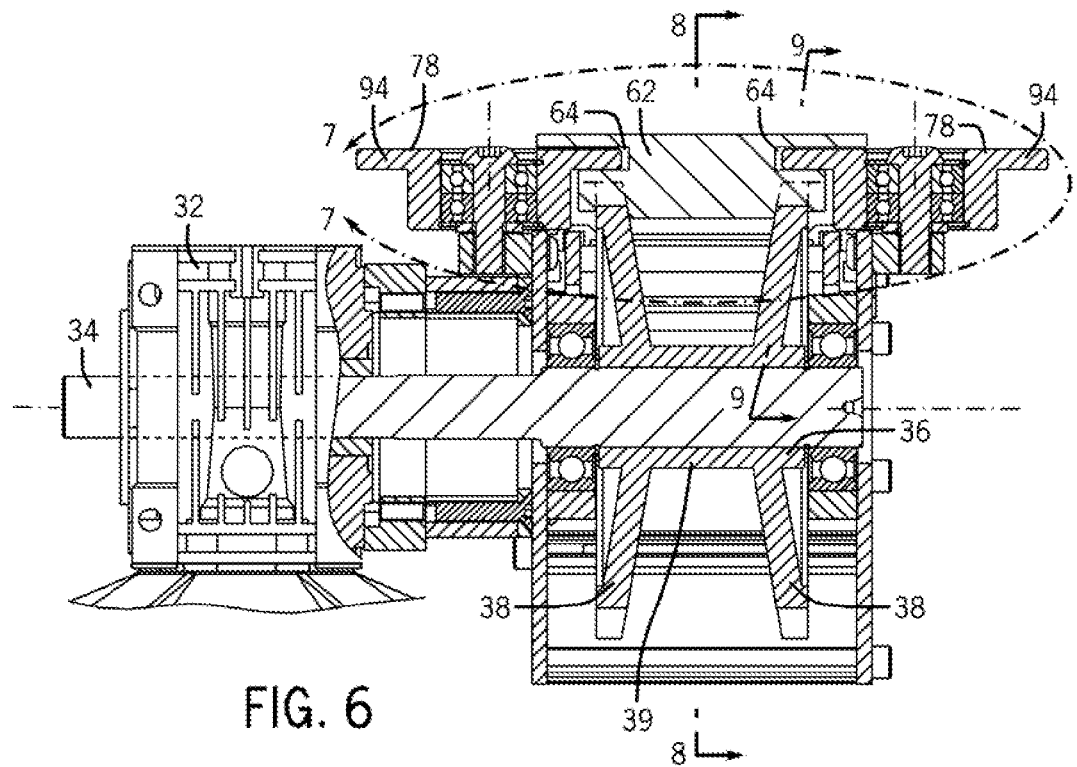
FIG. 6 is a section view taken along line 6-6 of FIG. 3.

The carousel conveyor 10 shown in FIGS. 1 and 2 includes a center drive module 30 that creates the motive force to move the conveyor chain around the continuous loop of the carousel conveyor 10. The position of the center drive module 30 is more clearly shown in the drawing of FIGS. 3, 4a and 4b. The drive module 30 includes an electric drive motor 32 that is operable to rotate a drive shaft 34. The drive shaft 34, which is better shown in FIG. 6, is coupled to a drive sprocket 36 having a pair of spaced sprocket wheels 38 extending from a center hub 39. Each of the sprocket wheels 38 includes a series of spaced teeth 40 that engage the conveyor chain to impart driven motion to the conveyor chain. The operation of the drive module 30 to impart driven motion to the conveyor chain will be discussed in greater detail below.

Referring back to FIG. 3, the support frame 14 of the carousel conveyor is formed from an extruded aluminum conveyor frame 42 having a center web 44 that separates an upper chain passageway 46 and a lower chain passageway 48. Although upper and lower chain passageways 46 and 48 are defined by the frame 42, in the embodiment illustrated, only the upper chain passageway 46 receives a continuous length of driven conveyor chain 62. The center web 44 extends to the sidewalls and defines the back wall 49 and an open mounting cavity 50 having a mounting slot 51. The open mounting cavity 50 provides a location for attaching various different types of operating components to the conveyor frame 42 in a known manner through the mounting slot 51. In the embodiment shown in FIG. 4a, the entire drive module 30 is mounted between a first section 52 and a second section 54 of the support frame. The drive module 30 spans the gap between the first and second sections 52, 54. The drive module 30 includes a pair of mounting plates 56 that include extending, mounting rails 74 (FIG. 5) that extend into the mounting cavity 50 formed in the first and second sections 52, 54.

Figure 4B:
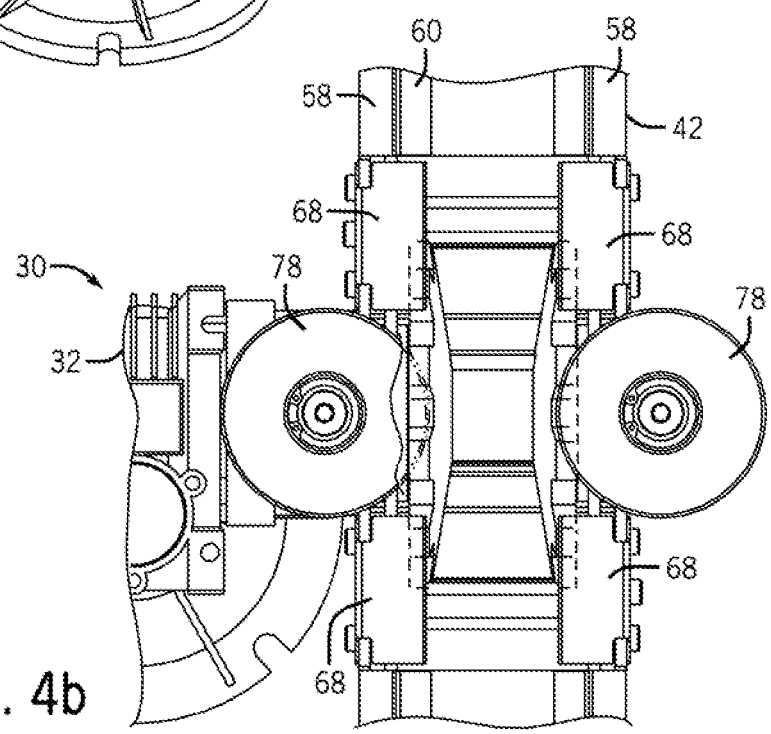

Referring now to FIGS. 4a and 4b, the frame member 42 includes a pair of top flanges 58 that extend from the sidewalls toward the center of the conveyor frame 42. In the embodiment shown in FIGS. 4a and 4b, each of the top flanges 58 includes a wear strip 60. The wear strip 60 is preferably formed from a durable, wear-resistant material that engages the conveyor chain as the conveyor chain moves along the length of the carousel conveyor.

Figure 7:
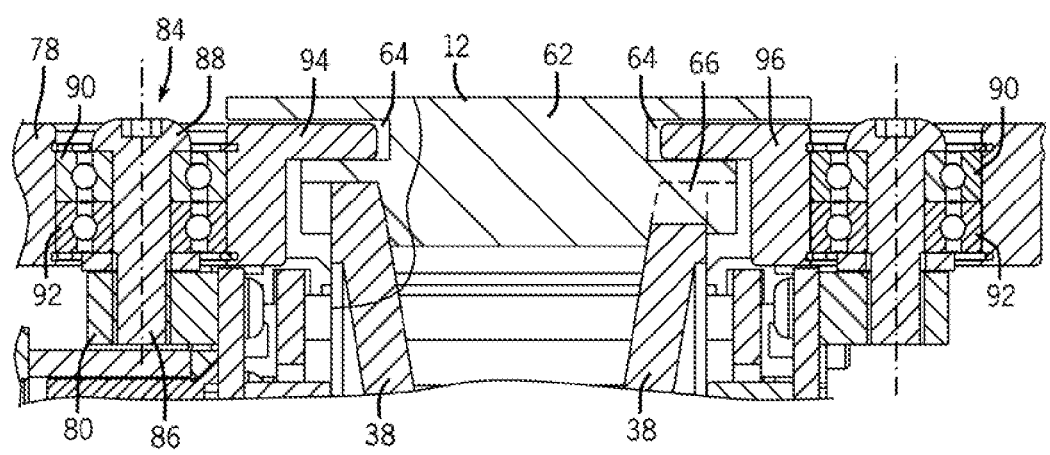
FIG. 7 is a magnified view taken along line 7-7 of FIG. 6.

FIG. 7 illustrates a cross-sectional view of one portion of the conveyor chain 62. The conveyor chain 62 includes the top surface 12 that supports material as the material moves along the length of the conveyor assembly. The conveyor chain 62 includes a pair of alignment slots 64 that are positioned above drive lugs 66. The alignment slots 64 each receive one of the top flanges 58 that guide the length of the conveyor chain along the continuous conveyor path, as illustrated in FIG. 3.

Figure 5:
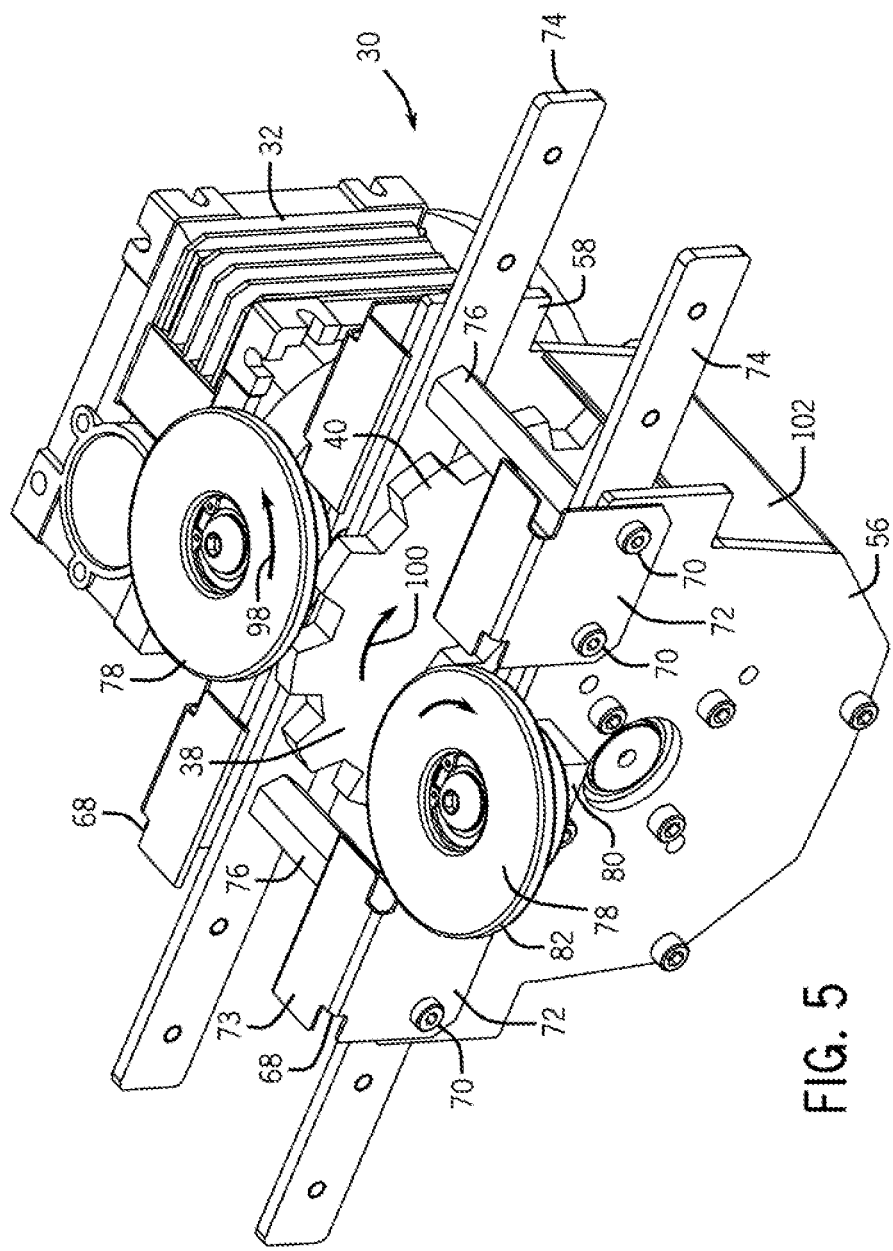
FIG. 5 is a perspective view of the center drive module removed from the carousel conveyor support frame.

Referring now to FIG. 5, each of the mounting plates 56 includes a pair of guide brackets 68. The guide brackets 68 are mounted to the mounting plates 56 by a pair of connectors 70. The connectors 70 pass through a vertical plate 72 which in turn is connected to a horizontal plate 73. The horizontal plate 73 receives a portion of the wear strip 60 (FIG. 4a) and the combination of the horizontal plate 73 and wear strip is received within the alignment slots 64 of the conveyor chain to help guide the conveyor chain through the gap between a first and second section 52, 54 of the conveyor frame, as shown in FIG. 4a. The connectors 70 pass through one of the mounting rails 74 that are each received in the mounting cavity 50 formed in the conveyor frame, as best understood in FIG. 4a. The mounting rails 74 thus support the entire drive module 30 between the first and second sections 52, 54 of the frame. A support block 76 extends between the spaced mounting rails 74 to provide additional support for the drive module 30.

During operation of the drive module 30, the drive motor 32 imparts rotation on the pair of spaced sprocket wheels 38 to move the conveyor chain along the longitudinal length of the conveyor path. However, since each of the sprocket wheels 38 are rotating, when the teeth 40 engage the bottom surface of the conveyor chain, the teeth impart both a horizontal and vertical force to the conveyor chain. Since it is undesirable to impart vertical motion onto the conveyor chain, the drive module 30 of the present disclosure includes a pair of guide rollers 78. As shown in FIG. 5, the guide rollers 78 are rotatably mounted to a mounting block 80, which in turn is securely mounted to one of the mounting plates 56. Each of the guide rollers 78 includes a circular outer contact surface 82.

As best shown in FIG. 7, each of the guide rollers 78 is rotatably supported about a connector 84 having a shaft 86 received in the mounting block 80 and a head portion 88. The shaft 86 extends through an upper bearing 90 and a lower bearing 92. The upper and lower bearings 90, 92 allow the guide roller 78 to freely rotate about the stationary connector 84.

Each of the guide rollers includes an outer flange 94 extending from a center hub 96. The center hub 96 receives the pair of upper and lower bearings 90, 92 while the outer flange 94 is sized to be received within the alignment slots 64 formed in the conveyor chain 62.

As can be understood in FIGS. 6 and 7, when the sprocket wheels 38 are rotating, the rotational movement of the sprocket wheels 38 imparts an upward force onto the conveyor chain 62. The upward movement of the conveyor chain 62 is resisted by each of the pair of spaced guide rollers 78. Specifically, the receipt of the outer flange 94 of each of the guide rollers 78 within the alignment slots 64 restricts the upward movement of the conveyor chain 62. Since the conveyor chain 62 is moving longitudinally along the length of the conveyor frame, the longitudinal movement of the conveyor chain 62 causes each of the guide rollers 78 to rotate within the alignment slots 64. Arrows 98 and 100 in FIG. 5 illustrate the rotational movement of the guide rollers 78 and the sprocket wheel 38 when the sprocket wheel 38 is driving the conveyor chain (not shown).

In the preferred embodiment of the disclosure, each of the guide rollers 78 is formed from a wear-resistant material. Since each of the guide rollers 78 is rotating along with the movement of the conveyor chain, the guide rollers 78 wear over their entire outer contact surface 82, which increases the overall effective life of the guide rollers 78.

Figure 8:
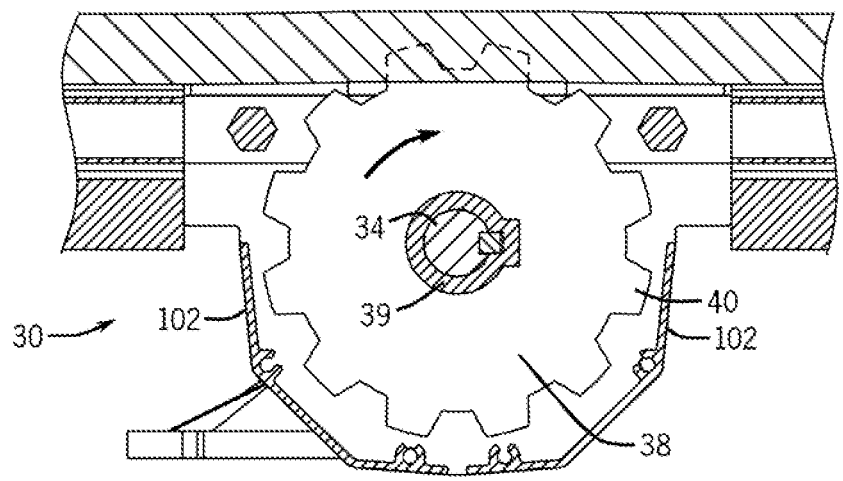
FIG. 8 is a section view taken along line 8-8 of FIG. 6.

As illustrated in FIG. 8, the drive module 30 includes a pair of protective covers 102 that are mounted between the pair of spaced mounting plates. The protective covers 102 shield the rotating sprocket wheel 38. The sprocket wheels 38 are connected to the hub 39, which is in turn coupled to the drive shaft 34.

Figure 9:
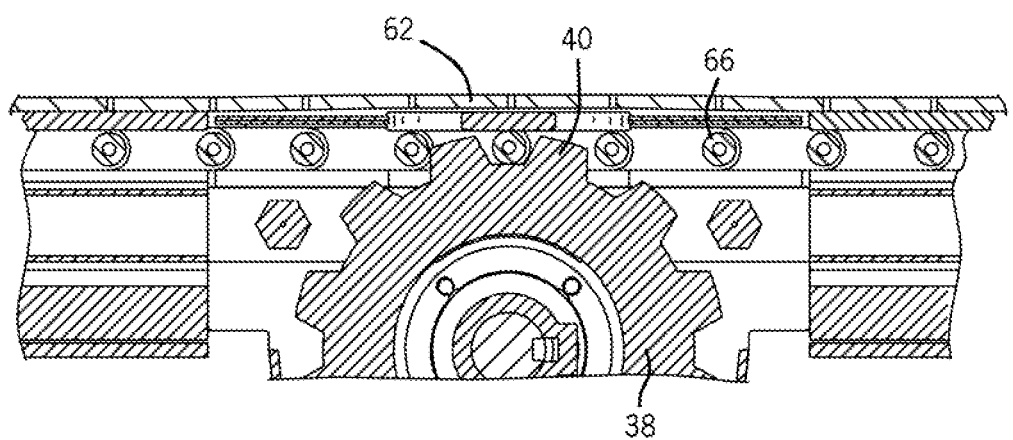
FIG. 9 is a section view taken along line 9-9 of FIG. 6.

FIG. 9 illustrates the interaction between the drive lugs 66 and the teeth 40 formed on the sprocket wheel 38. The drive lugs 66 are spaced approximately the same distance as the teeth 40 to encourage the driving relationship between the sprocket wheel 38 and the conveyor chain 62. However, different arrangements for the drive lugs 66 and the teeth 40 formed on the sprocket wheel 38 are contemplated as being within the scope of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A drive module for use with a carousel conveyor including a continuous loop conveyor chain movable along a support frame, comprising:

a drive motor;

at least one sprocket wheel rotatably driven by the drive motor, the sprocket wheel having a series of spaced teeth that engage the conveyor chain to move the conveyor chain along the support frame in a longitudinal direction; and a pair of guide rollers each positioned on opposite sides of the conveyor chain and on opposite sides of the at least one sprocket wheel and aligned with the at least one sprocket wheel, wherein the pair of guide rollers contact opposite sides of the conveyor chain and rotate when the conveyor chain is moving in the longitudinal direction.

2. The drive module of claim 1 wherein each of the drive rollers engage the conveyor chain and restrict movement of the conveyor chain in a direction perpendicular to the longitudinal direction.

3. The drive module of claim 1 wherein the drive motor and the pair of guide rollers are supported by a pair of mounting brackets that are each mounted to the support frame of the carousel conveyor.

4. The drive module of claim 2 wherein each of the guide rollers includes an outer flange that is received within an alignment slot formed in the conveyor chain.

5. The drive module of claim 4 wherein the outer flange of the guide rollers restricts vertical movement of the conveyor chain.

6. The drive module of claim 1 wherein each of the guide rollers is formed from a wear-resistant material and has a circular outer edge.

7. The drive module of claim 1 wherein each of the guide rollers is rotatably mounted within a mounting block connected to one of the mounting brackets.

8. The drive module of claim 2 wherein the at least one sprocket wheel engages a bottom surface of the conveyor chain.

9. A drive module for use with a carousel conveyor including a continuous loop conveyor chain supported along a support frame that defines a conveyor path, comprising:
a drive motor;
at least one sprocket wheel rotatably driven by the drive motor, the sprocket wheel having a series of spaced teeth that engage the conveyor chain to move the conveyor chain along the conveyor path in a longitudinal direction;
a pair of guide rollers positioned on opposite sides of the conveyor chain and on opposite sides of the at least one sprocket wheel and aligned with the at least one sprocket wheel, wherein each of the guide rollers includes an outer flange that is received within an alignment slot formed in the conveyor chain,
wherein the pair of guide rollers prevents movement of the conveyor chain in a direction perpendicular to the longitudinal direction.

10. The drive module of claim 9 wherein each of the drive rollers engages the conveyor chain and rotates with the longitudinal movement of the conveyor chain.

11. The drive module of claim 10 wherein each of the guide rollers and the drive motor are mounted to a pair of mounting brackets, wherein the mounting brackets are supported along the support frame of the carousel conveyor.

12. The drive module of claim 11 wherein each of the guide rollers are rotatably mounted within a mounting block connected to one of the mounting brackets.

13. The drive module of claim 9 wherein each of the guide rollers is formed from a wear-resistant material and has a circular outer edge.

14. The drive module of claim 9 wherein the at least one sprocket wheel engages a bottom surface of the conveyor chain.

15. A carousel conveyor comprising:
a support frame defining a conveyor path;
a continuous loop conveyor chain movable along the conveyor path, the conveyor chain including a plurality of drive lugs and a pair of alignment slots positioned beneath a top surface of the conveyor chain;
a drive module mounted to the support frame for moving the support chain along the conveyor path, the drive module comprising:
a drive motor;
at least one sprocket wheel rotatably driven by the drive motor, the sprocket wheel having a series of spaced teeth that engage the conveyor chain to move the conveyor chain along the conveyor path in a longitudinal direction;
a pair of guide rollers positioned on opposite sides of the conveyor chain and on opposite sides of the at least one sprocket wheel and aligned with the at least one sprocket wheel, wherein each of the guide rollers includes an outer flange that is received within one of the alignment slots formed in the conveyor chain,
wherein the pair of guide rollers prevents movement of the conveyor chain in a direction perpendicular to the longitudinal direction.

16. The carousel conveyor of claim 15 wherein each of the guide rollers and the drive motor are mounted to a pair of mounting brackets, wherein the mounting brackets are supported along the support frame of the carousel conveyor.

17. The carousel conveyor of claim 15 wherein each of the drive rollers engages the conveyor chain and rotates along with the longitudinal movement of the conveyor chain.

* * * * *